(12) United States Patent
Morin et al.

(10) Patent No.: US 6,996,528 B2
(45) Date of Patent: Feb. 7, 2006

(54) METHOD FOR EFFICIENT, SAFE AND RELIABLE DATA ENTRY BY VOICE UNDER ADVERSE CONDITIONS

(75) Inventors: Philippe R. Morin, Santa Barbara, CA (US); Jean-Claude Junqua, Santa Barbara, CA (US); Luca Rigazio, Santa Barbara, CA (US); Robert C. Boman, Thousand Oaks, CA (US); Peter Veprek, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 150 days.

(21) Appl. No.: 09/921,766

(22) Filed: Aug. 3, 2001

(65) Prior Publication Data

US 2003/0033146 A1 Feb. 13, 2003

(51) Int. Cl.
*G10L 15/22* (2006.01)

(52) U.S. Cl. ...................... 704/254; 704/270

(58) Field of Classification Search ................ 704/244, 704/246, 249, 251, 254, 270, 273, 275; 340/539.11, 340/539.13; 235/384
See application file for complete search history.

(56) References Cited

U.S. PATENT DOCUMENTS

| | | | |
|---|---|---|---|
| 4,870,686 A | | 9/1989 | Gerson et al. |
| 5,263,118 A | * | 11/1993 | Cornelison .................. 704/200 |
| 5,577,165 A | * | 11/1996 | Takebayashi et al. ....... 704/275 |
| 5,615,296 A | * | 3/1997 | Stanford et al. ......... 704/270.1 |
| 5,748,840 A | * | 5/1998 | La Rue ....................... 704/254 |
| 5,748,841 A | * | 5/1998 | Morin et al. ................. 704/257 |
| 5,920,838 A | * | 7/1999 | Mostow et al. ............. 704/255 |
| 6,038,534 A | * | 3/2000 | Richards ..................... 704/275 |
| 6,067,521 A | * | 5/2000 | Ishii et al. .................. 704/275 |
| 6,125,347 A | | 9/2000 | Cote et al. |

(Continued)

FOREIGN PATENT DOCUMENTS

EP 0 773 532 A2 5/1997

(Continued)

OTHER PUBLICATIONS

EPO, European Search Report, Apr. 5, 2004.

*Primary Examiner*—Martin Lerner
(74) *Attorney, Agent, or Firm*—Harness, Dickey & Pierce, PLC

(57) ABSTRACT

A method and apparatus for data entry by voice under adverse conditions is disclosed. More specifically it provides a way for efficient and robust form filling by voice. A form can typically contain one or several fields that must be filled in. The user communicates to a speech recognition system and word spotting is performed upon the utterance. The spotted words of an utterance form a phrase that can contain field-specific values and/or commands. Recognized values are echoed back to the speaker via a text-to-speech system. Unreliable or unsafe inputs for which the confidence measure is found to be low (e.g. ill-pronounced speech or noises) are rejected by the spotter. Speaker adaptation is furthermore performed transparently to improve speech recognition accuracy. Other input modalities can be additionally supported (e.g. keyboard and touch-screen). The system maintains a dialogue history to enable editing and correction operations on all active fields.

23 Claims, 2 Drawing Sheets

U.S. PATENT DOCUMENTS

| | | | |
|---|---|---|---|
| 6,216,102 B1 * | 4/2001 | Martino et al. | 704/9 |
| 6,553,131 B1 * | 4/2003 | Neubauer et al. | 382/105 |
| 6,553,345 B1 * | 4/2003 | Kuhn et al. | 704/275 |
| 6,641,038 B2 * | 11/2003 | Gehlot et al. | 235/384 |
| 6,826,566 B2 * | 11/2004 | Lewak et al. | 707/4 |
| 2002/0195490 A1 * | 12/2002 | Gehlot et al. | 235/384 |
| 2003/0033146 A1 * | 2/2003 | Morin et al. | 704/251 |
| 2004/0085203 A1 * | 5/2004 | Junqua | 340/539.11 |
| 2004/0233045 A1 * | 11/2004 | Mays | 340/425.5 |
| 2004/0246127 A1 * | 12/2004 | Junqua | 340/539.13 |

FOREIGN PATENT DOCUMENTS

| | | |
|---|---|---|
| EP | 1 045 373 A2 | 10/2000 |

\* cited by examiner

METHOD FOR EFFICIENT, SAFE AND RELIABLE DATA ENTRY BY VOICE UNDER ADVERSE CONDITIONS

FIELD OF THE INVENTION

The present invention relates generally to speech recognition technology and relates in particular to robust dialogue models for explicit error correction.

BACKGROUND OF THE INVENTION

In the field of speech recognition, the problems associated with error detection and correction vary according to the specific application and the situations and settings associated therewith. In a quiet office, for example, the user of a voice dictation application may rely on an active display in the form of a computer monitor to inform him/her of any errors in speech recognition. The same user may then correct any such errors with a computer keyboard. Alternatively, some applications permit a user to verbally select and correct text so displayed.

Drivers of automobiles find themselves in different situations. With both eyes and hands occupied with the task of driving, a driver may not always rely on an active display and keyboard for error detection and correction. At least one attempt at addressing this problem, Ishii et al., U.S. Pat. No. 6,067,521, entitled Interrupt Correction Of Speech Recognition For A Navigation Device, relies on relaying to the user a generated speech associated with a geographic location selected by the user for travel. If the user verbally enters a new location during processing of the first location or within a set timeframe, the previous entry is forgotten and the new one is taken instead.

Special problems, however, face the law enforcement officer attempting to input license plate information for search in a database. Recognition error rates remain high, particularly in noisy conditions frequently experienced by such officers. Common sources of noise include sirens, radio chatter, screeching tires, horns, and even gunfire. Emotional factors may also affect the quality of the speech (e.g. stress) making it more difficult to recognize. Adding to the difficulty of the situation, officers cannot always acquire the entire license plate information (including state, year and number) all at once. They must instead physically maneuver to facilitate visual inspection and acquisition of a few characters at a time. An officer attempting to enter a license plate number under the method taught by Ishii et al., for example, might first read in two characters of the plate. Then, upon pausing, the officer might read in a third character and replace the first two characters with the third character, thereby foiling entry of the data. Alternatively, under the same method, the officer may attempt to enter the entire plate at once and rely upon flawless speech recognition. Such flawless speech recognition remains highly unlikely under the adverse conditions frequently experienced by officers. Therefore, addressing the special needs for efficient, safe and reliable data entry by voice under adverse conditions remains the task of the present invention.

SUMMARY OF THE INVENTION

In accordance with one aspect, the invention provides a method of data entry by voice under adverse conditions. More specifically it provides a way for efficient and robust form filling by voice. A form can typically contain one or several fields that must be filled in. The user communicates to a speech recognition system and word spotting is performed upon the utterance. The spotted words of an utterance form a phrase that can contain field-specific values and/or commands. Recognized values are echoed back to the speaker via a text-to-speech system. Unreliable or unsafe inputs for which the confidence measure is found to be low (e.g. ill-pronounced speech or noises) are rejected by the spotter. Speaker adaptation is furthermore performed transparently to improve speech recognition accuracy. Other input modalities can be additionally supported (e.g. keyboard and touch-screen). The system maintains a dialogue history to enable editing and correction operations on all active fields.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
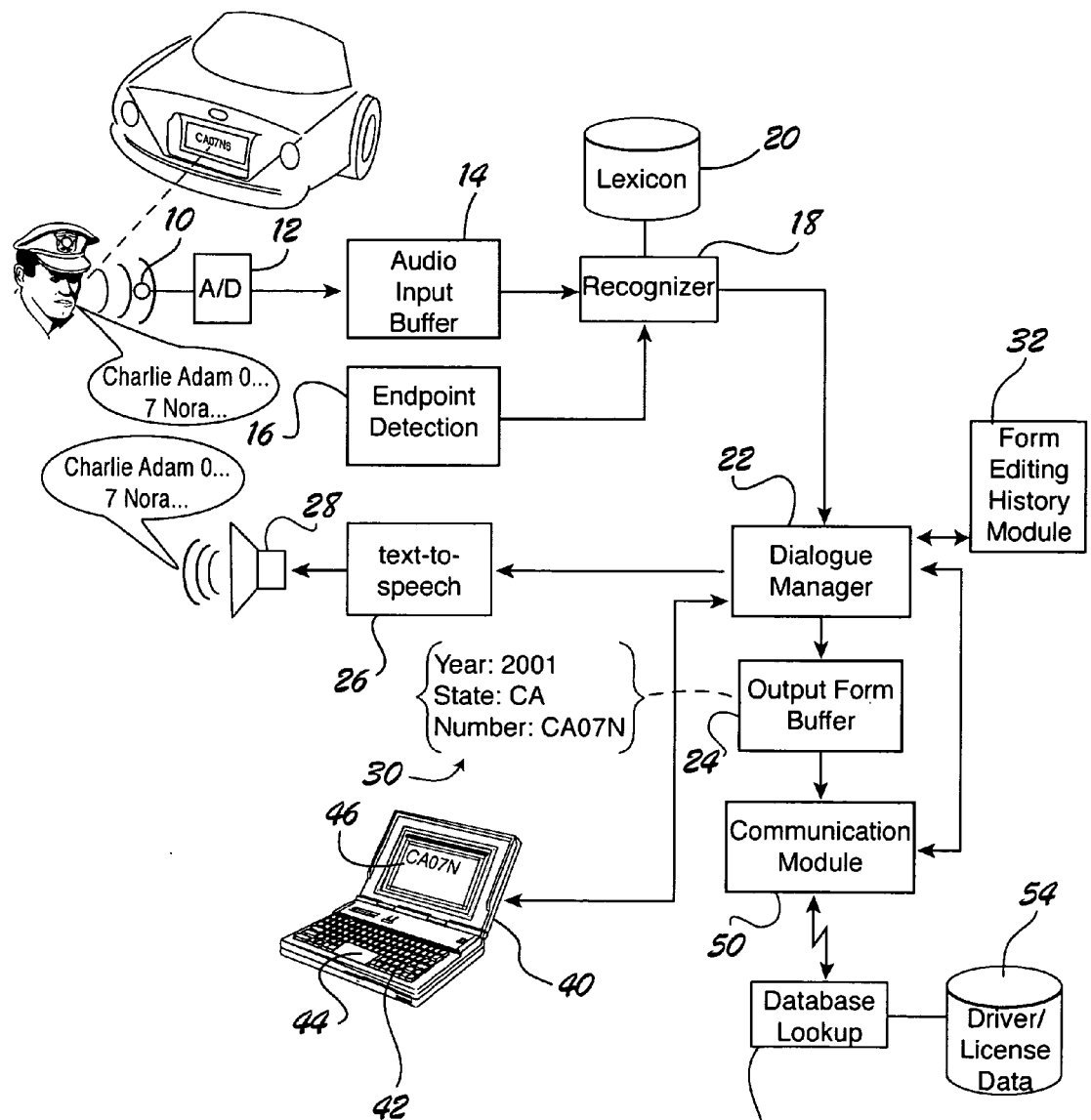
FIG. 1 is a system data flow diagram of a preferred embodiment of the data input system, illustrating one use of the system in a license plate entry system for law enforcement officers.

Referring to FIG. 1, the presently preferred implementation employs a suitable microphone 10 into which the officer speaks to input all or a portion of the license plate information under observation. The microphone 10 can be either a close-talking microphone adapted for handheld operation or attachment to the officer's clothing. The input system can optionally be wireless. Alternatively, the microphone 10 can be a noise-canceling microphone disposed in a suitable location within the officer's vehicle. If desired, a second microphone can be used to acquire a background noise signal that can be subtracted from the signal provided by the microphone 10 to thereby reduce the effects of ambient noise, which, in this application, can be substantial.

The output of the microphone 10 is coupled to an analog to digital converter 12, which supplies the audio input buffer 14. The input buffer 14 is preferably of a suitable size to store several utterances of input speech. Because of the potentially high background noise level, the system stores the audio input in the input buffer 14 for a sufficient time to allow the system to determine whether the contents of the input buffer 14 represents input speech or background noise.

To accomplish this, an endpoint detection module 16 continually samples the contents of the input buffer 14. The endpoint detection module 16 provides a "speech present" signal to a recognizer 18. The recognizer 18 employs a lexicon 20 of words that the recognizer 18 can recognize. Once the endpoint detection module 16 indicates that speech is present in the input buffer 14, the recognizer 18 analyzes the contents of the input buffer 14 by performing word spotting on the input audio signal. Thus, although endpoint detection is used to determine whether a speech signal is present, the actual beginning point and ending point of the input speech are determined by the recognizer 18 through word spotting.

Preferably, the recognizer 18 is designed as a continuous speech recognizer. In other words, the officer can speak in a normal speaking cadence as the officer would speak to another person. While it is possible for the officer to pause between individual word utterances, it is not necessary to do so because the continuous speech recognizer 18 is capable of handling a continuous speech cadence. Although the data entry form may contain several fields that must be filled in, the speaker does not have to explicitly tell the system what is the field having the input focus. Furthermore an utterance can provide information on several fields at once. In the case where three fields are present, namely a 'License Plate State' field, a 'License Plate Year' field, and a 'License Plate Number' field are present, the user could enter the state and the license number (in full or partial) with one utterance. The dialogue manager described below can handle such a flow based on the unambiguous semantic attached to the recognized words (i.e. the list of states is fixed and known in advance, values for the 'License Plate Year' field can be easily detected).

In the presently preferred embodiment the lexicon 20 stores trained models for all words that may be needed to describe the license plate entry form. In this regard, the letters of the alphabet, state names, and numerals 0 through 9, for example, are considered as "words" and are stored in lexicon 20. To help reduce speech recognition errors, a special vocabulary is used for the entry of letters. Each letter has a word equivalent that is less confusion-prone. In a noisy environment it is very difficult (even for human listeners) to differentiate between 'p' and 't' for example. In that particular example, the words 'Paul' for the letter 'p' and 'Tom' for the letter 't' are used instead. Also stored in the lexicon 20 are the additional spoken commands, discussed more fully below, by which the officer can correct either misread license plate numbers or incorrectly recognized spoken utterances, for instance.

The output of the recognizer 18 is supplied to the dialogue manager 22. The dialogue manager 22 serves several functions. One function is to parse the output words from the recognizer 18 and store them as blocks in an output form buffer 24. The dialogue manager 22 also analyzes the recognized words to segregate and act upon those that represent spoken commands as opposed to field information. Based on the semantic content of the input, the dialogue manager 22 dispatches the values to the appropriate field(s). In the case where the utterance "New Jersey Zebra 5 6" is spoken, the dialogue manager 22 will automatically replace the value of the state by 'NJ' and enter the string 'Z56' in the 'License Plate Number' field. The dialogue manager 22 communicates with a text-to-speech system 26 which provides speech feedback through a suitable speaker system 28. The text-to-speech system 26 may be based on speech synthesis technology, if desired. Alternatively, because the vocabulary of the text-to-speech system 26 is relatively limited, digitally recorded human speech can be used instead. Presently, such digitally recorded human speech is preferred because it sounds more natural.

The output form buffer 24 serves as the staging area for assembly of complete license plate information as the information is being identified by the officer and read into the system. The dialogue manager 22 can assign default values to some of the fields. In the case where the current year is 2001 and the police department using the system is Los Angeles for instance, the value 2001 is preferably set as a default value for the 'License Plate Year' and the value 'CA' for California is preferably set as a default value for the 'License Plate State'. An illustration of the contents of the output form buffer 24 is shown at 30. In the illustration, the officer has uttered "Charlie Adam Zero Seven Nora" and this utterance is stored in the output form buffer 24 as illustrated at 30. Assume that the officer has uttered the partial license plate information with two phrases, "Charlie Adam Zero" and "Seven Nora". The dialogue manager 22 treats these two input phrases as separate blocks, because they were uttered with a sufficient pause between phrases so that the recognizer 18 did not output them as one continuous phrase. The dialogue manager 22 maintains a form editing history module 32 to designate the contents of the last uttered block. The editing history within the form editing history module 32 keeps track of all changes occurring in all fields as will be more fully described below. This editing history allows the dialogue manager to delete the last uttered block if the officer gives the appropriate deletion command.

The presently preferred embodiment is multi-modal. Both speech and visual input and output capabilities are provided. To illustrate this, the dialogue manager 22 is shown as being coupled to a portable computer terminal such as a suitably equipped laptop computer 40 having a keyboard 42, pointing device 44, and touch-screen display 46. Thus, if desired, the officer can input license plate information using the keyboard 42, pointing device 44, or touch-screen display 46. Similarly, feedback to the officer is provided visually through the touch-screen display 46 as it is concurrently being provided via the speaker system 28.

Once the officer has input the complete license plate information and is satisfied with its accuracy, a spoken command to the dialogue manager 22 causes the output form buffer 24 to be flushed to the communication module 50. The communication module communicates wirelessly with a suitable database lookup server 52 which has access to the driver's license and license plate information database 54. The database lookup system 52 uses the license plate information provided by the officer to determine if the vehicle has any outstanding warrants or other information associated with it. This information is then communicated back to the communication module 50 and in turn provided to the dialogue manager 22. The dialogue manager 22 then displays the returned information on the touch-screen display 46 and also optionally outputs some or all of the returned information to the text-to-speech system 26.

In the presently preferred embodiment the dialogue manager 22 filters the returned information so that only the most important information is output through the text-to-speech system 26. In this way, the officer is not inundated with too much audible information as he or she is assessing how to handle the current situation. For example, if the identified vehicle is registered as having been stolen, or if the last known driver is believed to be armed and dangerous, that information would be communicated through the text-to-speech system 26. In contrast, if the vehicle was involved in a minor accident 3 years ago from which no charges were filed, that information would be suppressed.

The preferred embodiment implements a full duplex communication system. The officer can speak into the microphone 10 at the same time the text-to-speech system 26 provides audible feedback. In this regard, the preferred system is different from a half duplex radio communication system where one party talks while the other listens, but both parties cannot talk at the same time.

The full duplex system of the preferred embodiment is designed to provide a very natural dialogue interaction. The dialogue manager 22 is designed to respond to the officer's input utterances, and corrections of those utterances in a very natural fashion. This natural dialogue interaction is quite important, because police officers frequently encounter stressful situations requiring them to quickly comprehend a potentially threatening situation and react appropriately. Often it will not be possible for the officer to refer to a computer display screen or type on a keyboard. Thus speech may be the only practical means for the officer to obtain up to date information that can be relied upon.

In this regard, the license plate lookup problem is technologically more difficult than it might appear at first blush. First, because the background noise within a police vehicle is often quite high, and quite unpredictable, recognition systems are likely to make lots of mistakes. Unlike a word processing dictation system, where recognized words can be tested for accuracy by considering the surrounding context, the license plate lookup application is considerably more difficult because there is no context.

For example, in a word processing dictation application, a spoken utterance typically consists of nouns, verbs, adjectives, and adverbs which are strung together in a predictable way based on the grammar of the language. Knowledge of this grammar, sometimes referred to as the language model, allows the recognizer to do a better job of selecting the right word even where acoustic scores are low. In contrast, license plate numbers have no similar language model. The number 0 is equally likely to follow the number 1 as is the number 2, 3, or 4. To address the higher perplexity of the license plate lookup problem, the presently preferred embodiment uses a tightly coupled dialogue model that provides instant feedback to the officer of each uttered block of text, affording the officer the immediate opportunity to correct any recognition errors.

Figure 2:
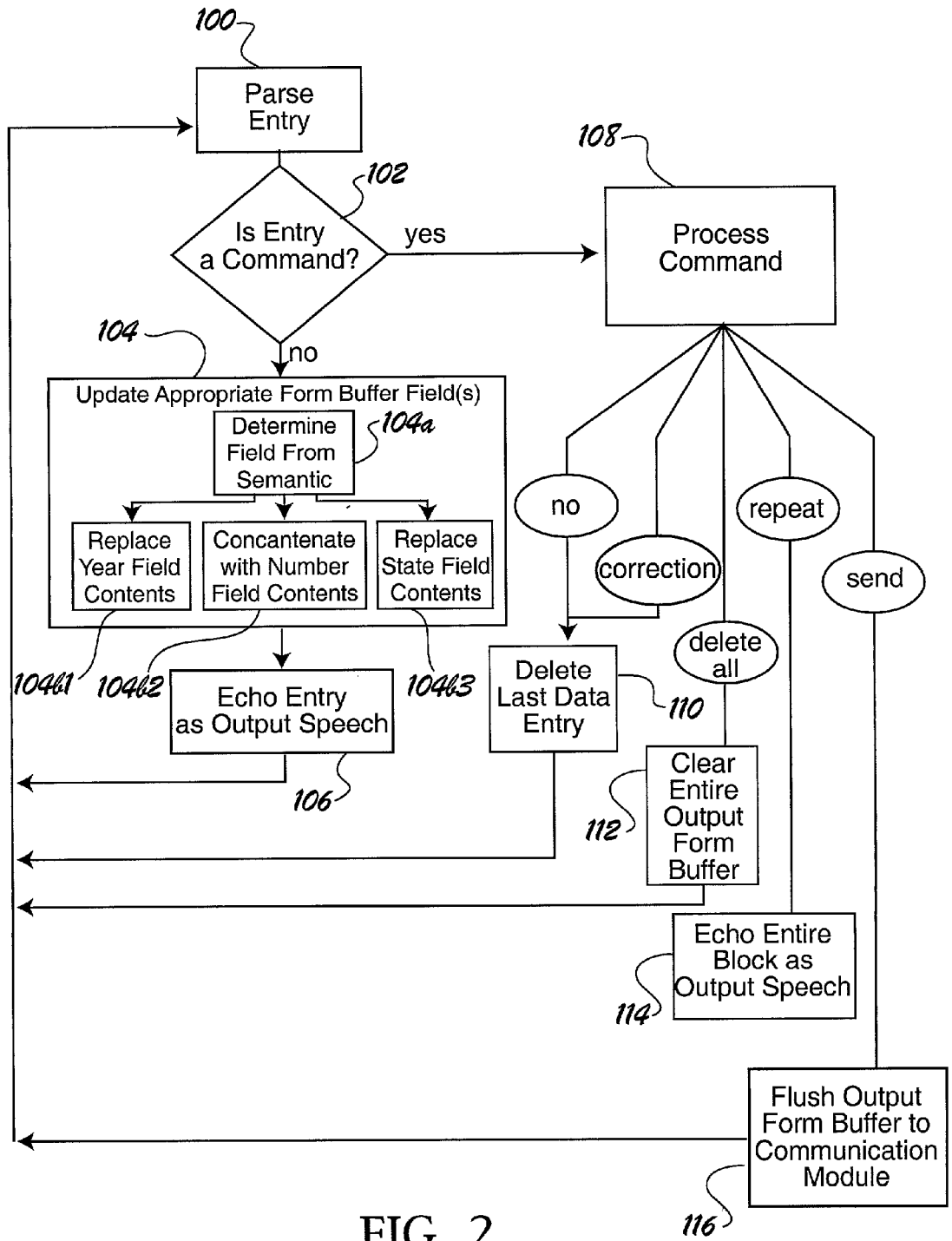
FIG. 2 is a flowchart diagram of one presently preferred method for parsing input words for data entry or as commands to effect correction functions.

FIG. 2 illustrates how the preferred dialogue manager 22 (FIG. 1) operates. The recognizer 18 (FIG. 1) supplies recognized output text as blocks of words as they are being recognized in continuous-speech fashion. Thus, for example, if the officer utters "Adam," "Boy," and "Charley" as three separate phrases, separated by natural speech pauses, the recognizer 18 will output three separate blocks each containing one word (i.e., those words corresponding to the letters A, B, and C). On the other hand, if the officer utters "Adam Boy" and "Charley", the recognizer 18 will output two blocks, the first containing the letters A and B and the second containing the letter C. The dialogue manager 22 treats the output from the recognizer 18 as entries to the dialogue system. As illustrated at step 100 (FIG. 2) the dialogue manager 22 parses the entry into blocks and each entry is then evaluated to determine whether it is either a field-specific data or a command. This step is illustrated at 102. If at step 102 the entry is not a command, the entry is used to update the appropriate output form buffer field (by replacement or concatenation) as depicted at step 104. As depicted at Step 104a, the fields to be updated are determined based on the semantic(s) attached to the recognized word(s). Update occurs by replacement of year field contents as depicted at step 104b1, concatenation with number field contents as depicted at step 104b2, and/or replacement of state field contents as depicted at step 104b3. The entry is then echoed as output speech (step 106).

Alternatively, if at step 102 the entry is determined to be a command, the command is processed at step 108.

Although there can be any number of commands, five exemplary commands are illustrated here. In FIG. 2, each command is identified as a separate logic flow path. For example, if the command is the word "no" that command is processed as at step 110 by deleting the last data entry.

Referring back to FIG. 1, if the command "no" is uttered immediately after the entry of the license plate letters "7N" then the last entered block "7N" is deleted.

Multiple commands can have the same action. Thus, as illustrated in FIG. 2, the command "correction" can also lead to deletion of the last data entry at step 110.

To allow the officer to delete the entire license information dictated thus far, the "delete all" is provided. Uttering this command will cause the entire contents of the output form buffer 24 (FIG. 1) to be cleared with all default values restored as depicted at step 112 (FIG. 2). If the officer wishes to have the contents of the buffer played back to allow the entire number to be verified, he or she can enter the "repeat" command. This command causes the system to echo the entire block as output speech to the text-to-speech system 26 (FIG. 1), as illustrated at step 114 (FIG. 2). Explicit commands to select the field for which the value will be uttered next can be defined. Thus, for example, a 'license year' command could be provided.

Once the officer is satisfied that the correct license plate information has been entered, the officer utters the "send" command. This command causes the contents of the output form buffer 24 (FIG. 1) to be flushed to the communication module 50 (FIG. 1) as depicted at step 116 (FIG. 2).

By way of further example, Table I shows an exemplary dialogue interaction. The table shows what speech the user has uttered (User Input), what message will be echoed to the text-to-speech system and/or supplementary sound generation means(Confirmation Message), and the current contents of each field of the form buffer. Note that Table I illustrates one example where the officer has made a visual error and has decided to delete the entire buffer and start over, and one example where the recognizer makes a recognition error and the officer has decided to correct it and continue.

Dialogue Turn #1:

| User Input = | "Utah 1 7" |
|---|---|
| Confirmation Message = | "Utah 1 7" |
| Form buffer = | (Year = "2001"; State = "UT"; Number = "17") |

Dialogue Turn #2:

| User Input = | "delete all" |
|---|---|
| Confirmation Message = | <DeleteAll Jingle> |
| Form buffer = | (Year = "2001"; State = NJ"; Number = "") |

Dialogue Turn #3:

| User Input = | "California 5 6" |
|---|---|
| Confirmation Message = | "California 5 6" |
| Form buffer = | (Year = "2001"; State = "CA"; Number = "56") |

Dialogue Turn #4:

| User Input = | "Ocean 9" |
|---|---|
| Confirmation Message = | "Ocean 5" |
| Form buffer = | (Year = "2001"; State = "CA"; Number = "56O5") |

Dialogue Turn #5:

| User Input = | "Correction" |
|---|---|
| Confirmation Message = | <Correction Jingle> |
| Form buffer = | (Year = "2001"; State = "CA"; Number = "56") |

-continued

Dialogue Turn #6:

| | |
|---|---|
| User Input = | "Ocean 9" |
| Confirmation Message = | "Ocean 9" |
| Form buffer = | (Year = "2001"; State = "CA"; Number = "56O9") |

Dialogue Turn #7:

| | |
|---|---|
| User Input = | "Zebra Mary 6" |
| Confirmation Message = | "Zebra Mary 6" |
| Form buffer = | (Year = "2001"; State = "CA"; Number = "56O9ZM6") |

Dialogue Turn #8:

| | |
|---|---|
| User Input = | "repeat" |
| Confirmation Message = | "California 56 Ocean 9 Zebra Mary 6" |
| Form buffer = | (Year = "2001"; State = "CA"; Number = "56O9ZM6") |

Dialogue Turn #9:

| | |
|---|---|
| User Input = | "send" |
| Confirmation Message = | "Searching database . . . " |
| Form buffer = | (Year = "2001"; State = "CA"; Number = "56O9ZM6") |

Speaker adaptation can be used efficiently in relation with the dialogue model. By learning the voice patterns that are specific to the speaker, the speech recognition accuracy can be improved. Progressively, after a few adaptations, the speaker-independent system becomes a speaker-dependent system. Based on the dialogue model, a safe adaptation procedure can be used. The blocks of speech that have been undisputed (i.e. corrected explicitly by the user) are candidates for adaptation. In that case the adaptation is transparent to the user and takes place in the background automatically. Optionally an explicit adaptation can also be used. In that case the speaker could be asked to say several phrases to the system prior to its use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of data entry by voice under adverse conditions for efficient and robust form filling, the method comprising:

communicating an input utterance from a speaker to a speech recognition means;

spotting a plurality of spotted words of at least two recognized spoken words within the input utterance, wherein the spotted words form a phrase containing at least one of field-specific values or commands;

obtaining blocks of text from input utterances separated from other input utterances by natural speech pauses, exactly one block of text per input utterance;

determining whether a block of text contains recognized values as opposed to commands;

populating a license plate number field of a form by concatenating, based on a sequence of input utterances from which the blocks of text are obtained, blocks of text determined to contain recognized values;

echoing blocks of text back to the speaker via a text-to-speech system, wherein audio feedback echoing the blocks of text is performed upon interpretation of each input utterance, and a sequence of recognized values echoed in the audio feedback reflects a sequence of spotted words within the input utterance from which the recognized values are obtained;

rejecting unreliable or unsafe inputs for which a confidence measure is found to be low; and maintaining a dialogue history enabling editing operations and correction operations on all active fields.

2. The method of claim 1, further comprising the step of determining a focus field based on word semantic, including distinguishing between the license plate number field and a state field based on recognition of a state name value as opposed to recognition of letter and number values.

3. The method of claim 1, wherein automatic adaptation is performed once a complete form has been filled and sent for search in a database.

4. The method of claim 1, wherein a backup input system is accommodated for additional safety and flexibility.

5. The method of claim 1, wherein commands include at least one of a correction command for deletion of a last data entry, a deletion command for clearing of an entire output form buffer with restoration of all default values, a repeat command for echoing of at least one of the contents of an entire form or the contents of an entire form field as output speech or a send command for flushing of an entire output form buffer to a communication module.

6. The method of claim 1, wherein field-specific values include at least one of letters or numbers for a license plate number field, numbers for a license plate year field, at least one of state names or state name abbreviations for a license plate state field, or at least one of vehicle make names or vehicle model names for a license plate vehicle type field.

7. The method of claim 1, wherein editing operations include at least one of replacement of the contents of a field with a field-specific value or concatenation with contents of a field of a field-specific value.

8. The method of claim 1, wherein correction operations include at least one of deleting a last data entry or clearing an entire output form buffer, wherein clearing of an entire output form buffer results in restoration of default values.

9. The method of claim 1, further comprising providing a full duplex dialogue interaction including speech recognition and passive, auditory feedback.

10. The method of claim 1, further comprising using a dialogue model that provides feedback to the speaker of each recognized block of text, affording the speaker an opportunity to correct recognition errors by: (a) speaking a command operable to designate a particular one of plural recognized blocks of text in the license plate field for replacement; and (b) providing a subsequent input utterance containing field specific values to replace the particular recognized block of text in the license plate field without replacing at least one other recognized block of text in the license plate field.

11. The method of claim 10, further comprising treating output from a recognizer as entries to a dialogue system.

12. An article of manufacture for data entry by voice under adverse conditions enabling efficient and robust form filling, the article of manufacture comprising:

an operating system;

a memory in communication with said operating system;

a speech recognition means in communication with said operating system;

a speech generation means in communication with said operating system; and a dialogue history maintenance means in communication with said operating system, wherein said operating system manages said memory, said speech recognition means, said speech generation means, and said dialogue history maintenance means in a manner permitting the user to monitor speech recognition of an input utterance by means of a generated speech corresponding to at least one of field-specific values or commands contained within the phrase formed by spotted words within the input utterance, and to perform editing operations and correction operations on all active fields, wherein audio feedback echoing at least one of recognized values or recognized commands is performed upon interpretation of each input utterance, and a sequence of recognized values echoed in the audio feedback reflects a sequence of spotted words within the input utterance from which the recognized values are obtained, said article of manufacture further comprising dialogue management means for using a dialogue model that provides feedback to the speaker of each recognized block of text obtained from an input utterance separated from other input utterances by natural speech pauses, exactly one block of text per input utterance, thereby affording the speaker an opportunity to correct recognition errors by: (a) speaking a command operable to designate a particular one of plural recognized blocks of text in a license plate field for replacement: and (b) providing a subsequent input utterance containing field specific values to replace the particular recognized block of text in the license plate field without replacing at least one other recognized block of text in the license plate field.

13. The article of manufacture of claim 12, further comprising a user interface, wherein said user interface provides a backup input system for additional safety and flexibility.

14. The article of manufacture of claim 13, wherein said user interface includes at least one of a keyboard, an active display or a touch screen.

15. The article of manufacture of claim 12, wherein the speech generation means includes at least one of a speech synthesizer or reproduction of a previously recorded voice.

16. The article of manufacture of claim 12, wherein a focus field is determined based on word semantic.

17. The article of manufacture of claim 12, wherein automatic adaptation is performed once a complete form has been filled and sent for search in a database.

18. The article of manufacture of claim 12, wherein commands include at least one of a correction command for deletion of a last data entry, a deletion command for clearing of an entire output form buffer with restoration of all default values, a repeat command for echoing of at least one of the contents of an entire form and the contents of an entire form field as output speech, or a send command for flushing of an entire output form buffer to a communication module.

19. The article of manufacture of claim 12, wherein field-specific values include at least one of letters or numbers for a license plate number field, numbers for a license plate year field, at least one of state names or state name abbreviations for a license plate state field, or at least one of vehicle make names or vehicle model names for a license plate vehicle type field.

20. The article of manufacture of claim 12, wherein editing operations include at least one of replacement of the contents of a field with a field-specific value or concatenation with contents of a field of a field-specific value.

21. The article of manufacture of claim 12, wherein correction operations include at least one of deleting a last data entry or clearing an entire output form buffer, wherein clearing of an entire output form buffer results in restoration of default values.

22. The article of manufacture of claim 12, further comprising a dialogue management means for providing a full duplex dialogue interaction including speech recognition and passive, auditory feedback.

23. The article of manufacture of claim 12, wherein said dialogue model treats output from said speech recognition means as entries to said dialogue management means.

* * * * *